Patented July 16, 1935

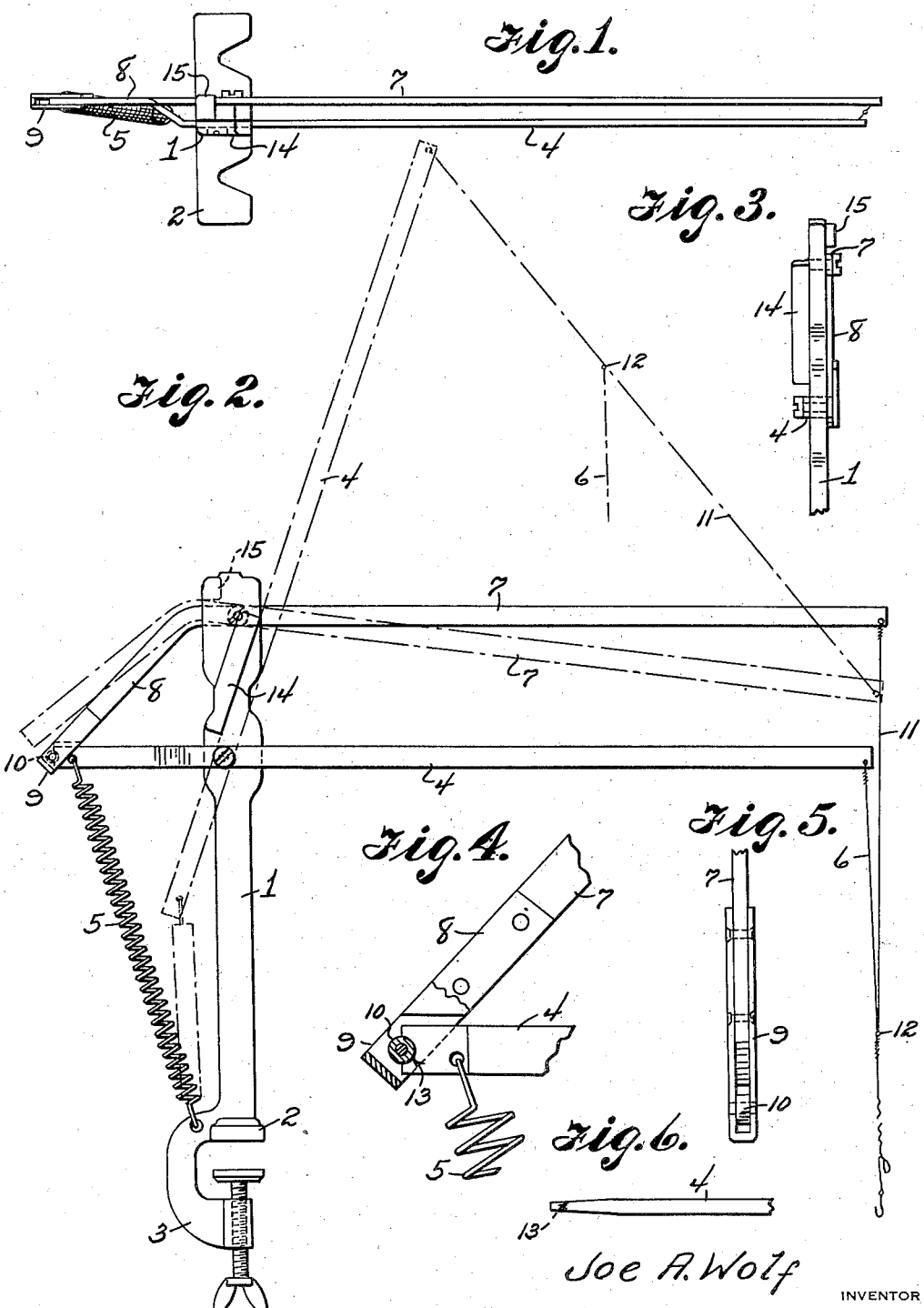

2,008,482

UNITED STATES PATENT OFFICE 2,008,482

FISHING LINE HOLDER

Joe A. Wolf, Cleveland, Ohio

Application June 12, 1934, Serial No. 730,335

3 Claims. (Cl. 43—15)

This invention relates to a fishing line holder, and has for the primary object the provision of a device which may be easily mounted on a support to relieve a fisherman of holding the fishing line while awaiting a bite or strike by a fish and which will automatically jerk the line when the fish takes hold of the hook with a pull to cause the hook to embed or catch into the fish and thereby assure hooking of the fish so that it may be pulled in without danger of pulling free of the line.

With these and other objects in view this invention consists in certain novel features of construction, combination and arrangement of parts to be hereinafter more fully described and claimed.

For a complete understanding of my invention, reference is to be had to the following description and accompanying drawing, in which Figure 1 is a top plan view illustrating a fishing line holder constructed in accordance with my invention.

Figure 2 is a side elevation illustrating the same.

Figure 3 is a fragmentary edge elevation illustrating the stops on the post of the device for limiting the pivotal movement of the arms which actuate and hold the line.

Figure 4 is an enlarged fragmentary sectional view showing the releasable connection between the arms.

Figure 5 is a fragmentary plan view illustrating one end of one of the arms.

Figure 6 is a plan view illustrating one of the ends of the other arm.

Referring in detail to the drawing, the numeral 1 indicates a post or standard formed integrally with a base 2 and integral with the latter and the lower end of the post is a clamp 3 adapted to cooperate with the base 2 in releasably securing the post to any suitable support. A line operating arm 4 is pivoted to the post a distance below the upper end of said post and the pivoted end of said arm is connected to the clamp 3 by a coil spring 5 while the other end of the arm is apertured to permit an auxiliary line 6 to be connected thereto. A holding or latch arm 7 is pivoted to the post 1 adjacent the latter's upper end and has an angularly related portion 8 to which is secured a strap 9 carrying a roller 10. The arm 7 is apertured to permit a fishing line 11 to be connected thereto. The auxiliary line 6 is secured to the fishing line, as shown at 12. The end of the actuating arm 4 to which the spring 5 is connected is provided with a notch 13 to form a seat for the roller 10. It is to be understood that the line 11 is equipped with the usual fishing hook, sinker and other fishing accessories when desired. This device is primarily adaptable for still fishing wherein the hook is baited and after the baiting of the hook and the depositing of the latter in the water the arms are positioned, as shown in Figure 2, in full lines bringing the spring 5 under tension. The arms are retained in this position by the notch receiving the roller 10. A fish taking the bait and making a pull on the line 11 disengages the roller 10 from the notch 13 freeing the line actuating arm 4 for movement into the dotted line position, as shown in Figure 2, which causes a considerable jerk on the line to bring about embedding of the hook into the fish's mouth. The line 11 then may be pulled in manually without danger of the fish becoming free from the line.

The post has integral therewith stops 14 and 15. The stop 14 limits the pivotal movement of the arm 4 beyond the dotted line position shown in Figure 2 under the influence of the spring 5 while the stop 15 acts to limit the pivotal movement of the arm 7 beyond the dotted line position shown in Figure 2. The pivotal movement of the arm 7 from the full line position to the dotted line position shown in Figure 2 is sufficient to free the actuating arms 4 from a set position.

Having described the invention, I claim:

1. A fishing line holder comprising a post, a clamp for securing said post to a support, an arm pivoted to the post and connected to a fishing line and having an angularly related portion, a roller carried by said portion, a second arm pivoted to the post and connected to the fishing line and having a notch to engage the roller, and a coil spring between the second arm and the clamp.

2. A fishing line holder comprising a post, a clamp for securing said post to a support, an arm pivoted to the post and connected to a fishing line and having an angularly related portion, a roller carried by said portion, a second arm pivoted to the post and connected to the fishing line and having a notch to engage the roller, a coil spring between the second arm and the clamp, and stops upon the post to limit the pivotal movement of said arms.

3. A fishing line holder comprising a vertically arranged post, an arm pivoted to the post adjacent its upper end thus providing said arm with long and short portions, the long portion being connected to a fishing line and having its short portion bent angularly to the long portion, a second arm pivoted to the post below the first arm and including long and short portions with the long portion connected to the fishing line and having the short portion notched to engage the short angularly disposed portion of the first arm, and a spring between the post and the short portion of the second arm.

JOE A. WOLF.